United States Patent
Digiorgio et al.

(10) Patent No.: US 6,748,532 B1
(45) Date of Patent: Jun. 8, 2004

(54) UNIVERSAL SMART CARD ACCESS SYSTEM

(75) Inventors: Rinaldo Digiorgio, Easton, CT (US); Stephen Uhler, Los Altos, CA (US); Moshe Levy, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/430,524

(22) Filed: Oct. 29, 1999

(51) Int. Cl.$^7$ .............................................. H04L 9/12
(52) U.S. Cl. ...................................................... 713/159
(58) Field of Search ................................ 713/159, 155, 713/182, 185, 202, 172; 705/64, 65, 67

(56) References Cited

U.S. PATENT DOCUMENTS

| | | | |
|---|---|---|---|
| 5,844,218 A | * 12/1998 | Kawan et al. | 235/380 |
| 5,905,908 A | 5/1999 | Wagner | |
| 5,909,492 A | 6/1999 | Payne et al. | |
| 6,111,522 A | * 8/2000 | Hiltz et al. | 340/932.2 |
| 6,182,900 B1 | * 2/2001 | Wiehler | 235/492 |
| 6,564,995 B1 | * 5/2003 | Montgomery | 235/379 |

FOREIGN PATENT DOCUMENTS

| | | |
|---|---|---|
| DE | 197 10 249 | 9/1998 |
| NL | 0 827 120 A1 * | 3/1998 |
| WO | WO 00/25221 | 5/2000 |
| WO | WO 00/79411 | 12/2000 |

OTHER PUBLICATIONS

Verschuren, T., Smart access: strong authentication on the Web, Computer Networks and ISDN Systems, Sep. 30, 1998, pp. 1511–1519, vol. 30, No. 16–18, Holland Publishing, Amsterdam, The Netherlands.

* cited by examiner

Primary Examiner—Matthew Smithers
(74) Attorney, Agent, or Firm—Gunnison, McKay & Hodgson, L.L.P.; Philip J. McKay

(57) ABSTRACT

The present invention is a universal secure token scheme that provides two way authentication, credit, debit, and stored value operations. The invention permits the use of universally available networks to access corporate, private, and proprietary devices. The invention provides strong authentication, offers optional encryption of the established session, and operates without requiring special permission to reconfigure firewalls. One application of the invention provides a universal token scheme that can be used in debit and stored value transactions. In one embodiment, devices and services are treated as URLs and a smart card is configured to perform the necessary HTTP protocol to access the URL.

20 Claims, 2 Drawing Sheets

UNIVERSAL SMART CARD ACCESS SYSTEM

BACKGROUND OF THE INVENTION

1. Field of the Invention

This invention relates to the field of universal smart card access.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Java, JavaBeans, HotJava and all Java-based trademarks and logos are trademarks or registered trademarks of Sun Microsystems, Inc. in the United States and other countries.

2. Background Art

The internet has become a pathway to a number of goods and services that in the past were only available in direct transactions or through special purpose networks. However, it is desirable to provide a manner to increase the availability of goods and services through the internet while maintaining adequate levels of security and authentication.

Consumers and users can access goods and services in direct transactions or via networks. In direct transactions, a consumer may purchase goods or services at a store or other point of sale location, using cash, checks, or credit cards. A consumer may also access and purchase goods and services using the internet. In internet transactions, the customer often pays for goods or a one time service with a credit card. Some internet services may be recurring or subscription services. In those cases, the customer provides automatic debiting from a credit card to pay or pre-pay for the services.

Sometimes a computer user is an employee of a company that has a proprietary network or secure intranet. Often the employee wishes to access company network services and data when traveling or when otherwise outside of the company firewall (such as working from home). Traditionally, the employee would be denied access to the company network, or, some limited access is granted. In some cases, access is granted by using some authentication protocol (possibly including password, hash, encryption, etc.).

One thing the above scenarios have in common is the notion of providing some sort of identification or authorization to perform the desired transaction. At a point of sale purchase, the consumer may provide some form of identification in addition to cash, check, or credit card, or the consumer may be known to the seller. For some internet transactions, the user must register with the service provider and wait for credit card approval before services are provided or goods are shipped. In the case of the company network, the employee provides a password for authorization, and may also need knowledge of a correct dial in number or port to even attempt access of the company network. Further, because of the security schemes involved, access to the system may require a high speed connection or high power processor to handle sophisticated security systems. Such configurations may not always be available.

Referring again to consumer transactions, a consumer may have a number of credit cards (e.g. Visa, Mastercard, American Express, Discover) that entitle the user to make purchases and have funds advanced on the user's behalf for goods and services. For an employee, a corporation may provide an employee with a corporate ID card that entitles the employee to access to certain physical locations, and might also be used to access goods and services. For example, an employee may need the card to enable the employee to access certain computer networks, intranets, web sites, etc., that would not be accessible without the card. Some companies may also permit employees to "charge" goods or services in company provided locations, such as food services, supplies, company stores, or the like.

A problem with current technology is the need to have a different card for each service provider, and sometimes different cards for the same service provider. When the user has three different credit card accounts, the user must have three physical credit cards. If the user also needs a company ID card, the user must carry one of those. Thus, it is a disadvantage to the user to need to carry multiple cards.

Another problem with current technology is the need to have secure, authorized, and trusted transactions for each card. Currently, each card issuer has a specific technique for providing trusted, secure, or authorized transactions. This requires companies that agree to interact with more than one kind of card to be able to satisfy the techniques and protocols or each card. When the consumer is considered to be the client in a client/server relationship, a problem arises for the server to be able to support many possible authorization protocols. Not only must a server pick and choose which standards to support, but the server must be ready to upgrade or add service for protocols that may not even exist yet.

For example, one prior art scheme for implementing the fund transfer aspect of smart cards is known as the "Mondex" system. The Mondex system is a method of transferring funds or tokens from one smart card to another. The Mondex system is a seven step system of communications, challenges, and acknowledgments between two smart cards or between a smart card and a host system. Another token transfer scheme is a system used by Visa that is a five step system. Other schemes are three step systems. American Express, MasterCard, and Discover may each have proprietary systems as well.

Finally, there has to date been no satisfactory way to permit access to potentially private or restricted company resources via the internet using standard browsers.

SUMMARY OF THE INVENTION

The present invention provides two way authentication, credit, debit, and stored value operations on a smart card. The invention permits the use of universally available networks to access corporate, private, and proprietary devices. The invention provides strong authentication, offers optional encryption of the established session, and operates without requiring special permission to reconfigure firewalls. One application of the invention provides a universal token scheme that can be used in debit and stored value transactions. In one embodiment, devices and services are treated as URLs and a smart card is configured to perform the necessary HTTP protocol to access the URL.

DETAILED DESCRIPTION OF THE INVENTION

Figure 1:
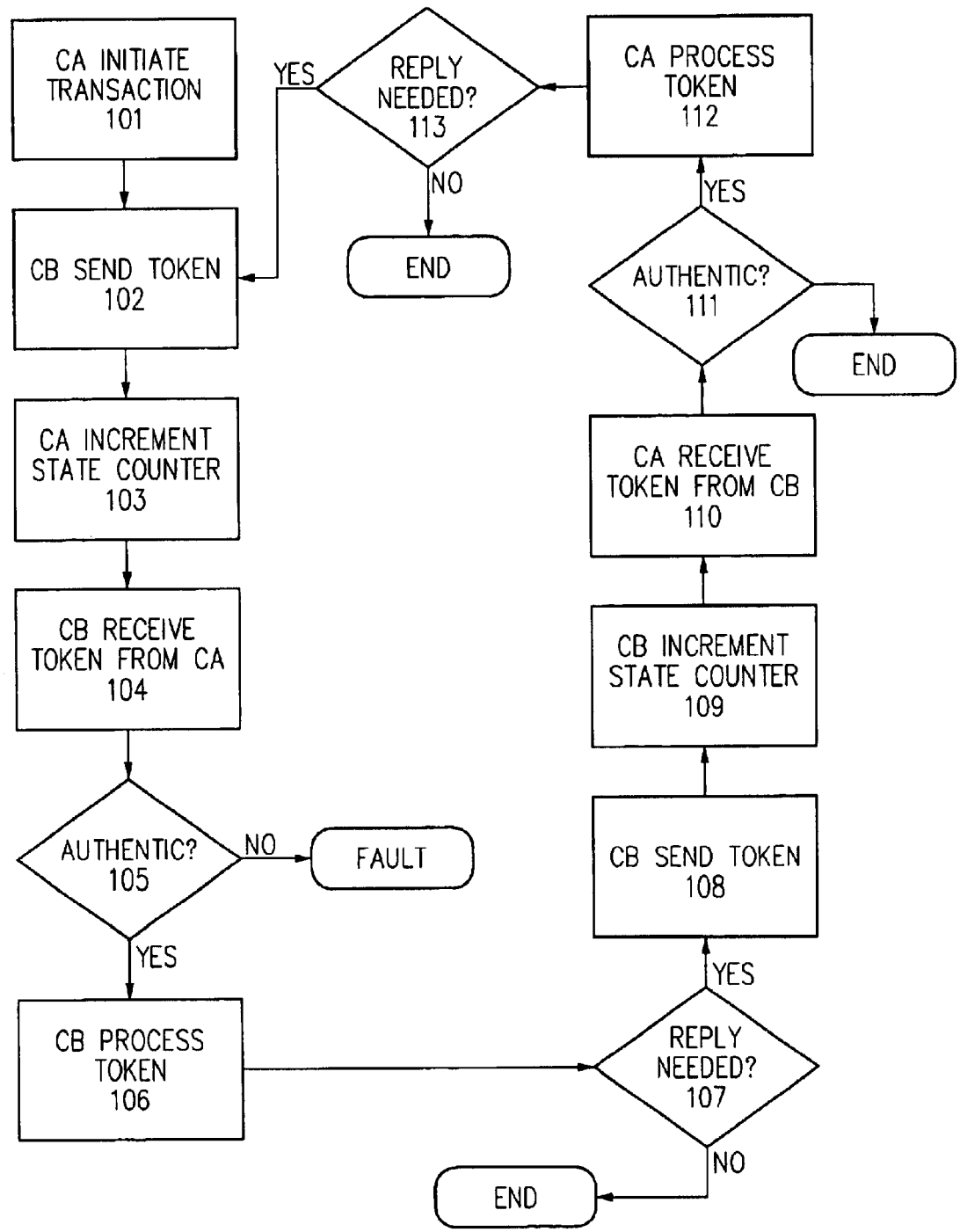
FIG. 1 illustrates a flow diagram of a universal transaction in transaction using an embodiment of the present invention.

The invention is a method and apparatus for providing a universal access system for clients and servers. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

The present invention provides a secure and generalized client/server system for communicating tokens between a client and a server. The tokens can represent authorizations, identifications, funds, credits, debits, and other transactional abstractions. The system can support, any number of specific protocols by sending required challenges and responses inside the general protocol. If a server can implement the universal token scheme, then regardless of the individual transfer protocol, such as Visa, Mastercard, etc., the server can process the transaction. In this manner, a server implementing the system need never rewrite its protocol to adapt to new authorization or security schemes.

The invention provides a universal secure token scheme that can be used by card holders and servers to support a number of existing and future token transfer protocols. If a server can implement the universal token scheme, then regardless of the individual transfer protocol, such as Visa, Mastercard, etc., the server can process the transaction.

The invention, in one embodiment, is implemented on Java smart cards. Identical to the size of a credit card, a smart card stores and processes information through electronic circuits embedded in silicon in the plastic substrate of its body. There are two well known types of smart cards, intelligent smart cards and memory cards. An intelligent smart card contains a microprocessor and offers read, write, and calculating capability, like a small microcomputer. A memory card, on the other hand, does not have a microprocessor and is meant only for information storage. A memory card uses security logic to control the access of memory. A Java smart card is a card capable of running Java programs and applets.

The present invention contemplates treating devices and services as URLs so that they can be accessed via web browsers. This permits the generation of consistent and reliable www applications that interface to different devices. The invention relies on two levels of abstraction. First is that financial transactions, service providers, and network access can be thought of as accessing a device that has a specific location. The second is that the majority of transactions can be seen as token passing transactions.

The invention takes advantage of these abstractions by implementing a system where each side of a transaction is given a URL address. The invention then uses the URL programming interface, UPI to create a framework for communication. The UPI was developed by Sun Labs in response to customer desires to deploy Java Card smart cards to large user populations on disparate targets. While developing a solution for such large scale deployment of smart cards, it was found that the same technology could be used for interfacing a multitude of devices, such as weather stations, home automation systems, devices in factories, and equipment in stores. One of the benefits of this architecture is that the different components can easily be used with each other. For example, you can use a smart card to authenticate access to your home by having it interact with your home network and/or environmental systems. Another application is to authenticate with money transfer protocols.

The protocol for server and client can be implemented in the Java programming language, making the current invention platform independent. The invention provides a general scheme for getting information from a first smart card to a second smart card (or server) and back to the first smart card without knowing the specific protocol used by either card. In other words, although the underlying bits and content might change, the steps required to move bits and content back and forth will not have to change.

At a high level, the universal token passing communication scheme operates as in FIG. 1. FIG. 1 is a flow diagram illustrating the communication of tokens between a first card, Card A (CA) and a second card, Card B (CB). It should be noted that although the example is of a card to card transaction, one or both of the cards could be a server or other processing system. The assumption of the example is that the tokens being passed are going through a potentially nefarious middleman (such as through an ordinary browser over the internet). In addition, the communication fabric between the cards or devices may be the internet, the telephone network, intranet, corporate network, LAN, cellular network, or any other communication fabric. The card may also be implemented in a cell phone for example, and the cell phone can be used to authenticate transactions.

At step 101 CA initiates the transaction and at step 102 sends a token to CB. Each transaction in this embodiment of the invention takes the following form:

<challenge>, <ID>, <step #>, <amount>, <op>, <hash>

Challenge is a transaction ID, a random number provided in the first transmission and used to prevent replay attacks. This is one of the security features of the token passing scheme. ID is the ID of the card generating the packet. It is used for fixing broken transactions, keeping transaction logs, and verifying that all steps in a transaction actually happen with the same card.

Step # is a state machine step counter. This feature enables the universal protocol of the invention to be used with multiple card to card protocols. For example, if a seven step Mondex protocol is needed, the smart card will send tokens back and forth until the seven Mondex steps have been accomplished. Similarly, a five step or three step protocol can just as easily be accomodated. This means that if a new scheme is implemented in the future, the server can accept transactions with no change in code. The card will increment a counter so that steps can be tracked and the end of the transaction can be identified.

"Amount" is the transfer amount, if any, and can be greater than or equal to zero. "Op" is the operation or result code. Hash is the hash of all of the data in the token plus a "secret" to authenticate the card and the transaction data. In one embodiment, it is presumed that all cards include and know a secret but that the secret is not otherwise known. The secret can be assigned when the card is initialized, such as by a Bank or other trusted authority.

After sending the token, CA increments its state counter as appropriate at step 103. At step 104, CB receives the token. At step 105, CB attempts to authenticate the token. If not authentic, a fault is generated (a broken transaction). If authentic, CB processes the token at step 106. If no reply is needed at step 107, the transaction ends. If a reply is needed, CB prepares and sends a token to CA at step 108 and increments its state counter at step 109.

At step 110, CA receives the token from CB. CA attempts to authenticate it at step 111. If not authentic, a fault is generated. If authentic, CA processes the token at step 112. If no reply is needed at step 113, the transaction ends. If a reply is needed, the system returns to step 102 and CA prepares and sends a token.

SecureTokenDeviceHandler

The present invention implements an API for obtaining information from a smart card transaction token (examples include card ID). This API is called the SecureTokenDeviceHandler. The API supports the following operations.

GetID: Returns the card number of the current card (card numbers are assigned by the application).

GetPurse: Returns all currencies and/or tokens supported.

GetInfo: Returns general information about the card.

CheckPin: Given a PIN, returns a message digest based on SHA1, XOR, or the like.

VerifyPin: Verifies a given digest. Usually done with a server.

ChangeSetPin: Changes or modifies user PINs.

ValueTransfer: Performs a value transfer (requires a server SecureTokenHandler).

Decrypt: Decrypts the input data, with optional type.

ValueTransfer: Encrypts the input data, with optional type.

Using this API, a smart card and server can effect all credit card and debit card protocols even if they are not aware of or prepared for a specific protocol. Source code for the SecureTokenServices handlers supports URLs that allow the implementation of complete end-to-end solutions for smart card micro- or macropayments, personal profiling, form filling and authentication.

Suppose, for example, that it was desired to get the ID of a smart card. The card could be sent a URL of the form:

http://localhost:1234/SecureTokenHandler/GetID

The handler would take the URL, parse and determine which command it is being sent, then return the values to as either a name/property pair or as a Web page, depending on configuration options.

CheckPin asks that a handler called SecureTokenServices process the command VerifyPersonalCode with the arguments supplied. The arguments are a PIN and a challenge. The challenge is a random collection of bits generated for purposes of implementing a challenge-response protocol. The handler takes the arguments and, in this case, generates a cryptographic signature, which it returns as a URL-encoded name value pair. The cryptographic signature was generated by sending the string to a Java Card. The cryptographic signature can then be sent to the server, which can determine the validity of the signature.

Source code for the SecureTokenServices handlers supportsing URLs that allow you to implement complete end-to-end solutions for smart card micro- or macropayments, personal profiling, form filling and authentication can be found in Appendix A attached hereto.

Providing Services

Java applets on the smart card provides services via Application Data Protocol Units (APDUs) needed to perform an operation—to authenticate, for example.

Financial Transaction Universal Protocol

There are four principal operations carried out in the transaction scheme of the present invention, debit, credit, activate, and balanceCheck. Debit, credit and balanceCheck each go through an authentication procedure consisting of four Application Protocol Data Units (apdu) exchanges. The four exchanges in a system consisting of a smart card and a server are as follows:

1. server to card (initiate transaction).
2. card to server (indication funds have been placed in reserve).
3. server to card (giving the ok to commit transaction).
4. card to server (ack that commit has taken place).

From the card's perspective, there are two authentication procedures to go through: authentication of the "initiate transaction" apdu in step 1, and authentication of the "ok-to-commit" apdu in step 3. In this example, this there are two "levels" of authentication: level 1 (after step 1) and level 2 (after step 3). Note that more steps and levels of authentication could be added at any time. Different purse functions may be performed at different levels (functions in this example are performed at level two). It should be noted that steps 3 and 4 may not terminate on the first pass through. Because of the state machine feature in the universal protocol, steps 3 and 4 may repeat any appropriate number of times as necessary to implement a particular protocol.

The present invention provides an abstraction that eliminates the requirement of determining a number of exchanges required before a transaction request is authenticated. Instead, the present invention allows the ability to define at what level of authentication is a transaction to be allowed." This is the same as asking "how secure does this transaction have to be?" It should be noted that the server can be another smart card or a host computer system.

Example Transaction

Figure 2:
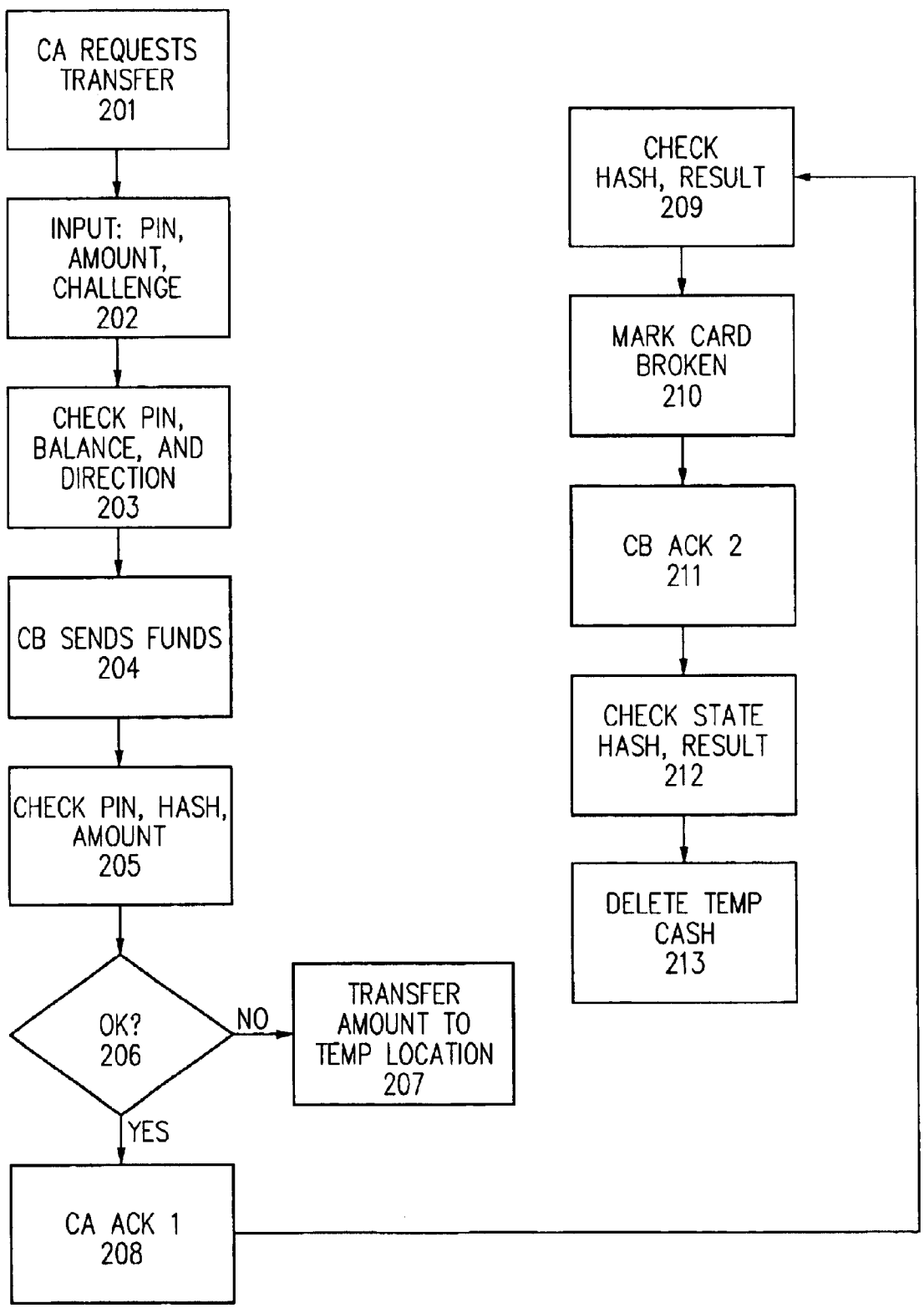
FIG. 2 illustrates a flow diagram of a universal financial transaction protocol of the present invention.

The following is an example transaction between a first card CA and a second card CB and is illustrated in the flow diagram of FIG. 2. At step 201 CA requests a transfer of funds from CB. At step 202 the input of PIN, amount and challenge is made to CB. The challenge is an externally generated random number, the transaction ID, the PIN, the card's PIN, and the transfer amount. At step 203 the balance is checked (it should be greater or equal to the amount to be transferred) and the direction of transfer is checked, and the PIN by CB.

At step 204 CB sends the funds. At step 205 the PIN, hash, and amount are checked. If the transaction is OK at step 206, the flow proceeds to step 208 and CA does ACK 1. If not, the amount is transferred to a temporary location and the card is marked as broken. At this point, if the transaction is terminated, CA is ok, and CB is broken with the funds "in transit".

At step 209 CA checks the hash and result. If the check is not correct, at step 210 the card is marked as broken and the amount is moved to a temporary location. At this point the termination of transaction means that CA is broken, funds in transit and CB is broken, funds in transit.

At step 211, ACK 2 is performed by CB. At step 212, the operation check hash, state, and result is performed by CB. If the system checks out, the transaction is complete and the temporary cash is deleted at step 213 and the card is marked "not broken". If the transaction is terminated after step 212, CA is broken with funds in transit, and CB is OK with transaction complete.

Thus, a universal access scheme has been described.

What is claimed is:

1. A universal access method comprising:
   in a first processing device, generating and sending a first secure token via an insecure communication fabric;
   authenticating said first secure token;
   replying to said first secure token when said first secure token is authenticated; wherein,
   said first secure token represents at least one transactional abstraction; further wherein,
   said at least one transactional abstraction comprises a state machine step counter.

2. The method of claim 1 wherein said state machine step counter is incremented according to a protocol type.

3. The method of claim 1 wherein said authenticating step executes on a second processing device.

4. The method of claim 3 wherein said second processing device comprises an associated URL.

5. The method of claim 3 wherein said second processing device generates a fault if said authenticating step fails.

6. The method of claim 1 wherein said first processing device comprises a smart card.

7. The method of claim 1 wherein said first processing device comprises an associated URL.

8. A universal access system comprising:
- a first processing device configured to generate and send a first secure token representative of a transactional abstraction via an insecure communication fabric;
- a second processing device configured to authenticate said first secure token and reply to said first secure token when said first secure token is authenticated;
- wherein said at least one transactional abstraction comprises a state machine step counter.

9. The system of claim 8 wherein said state machine step counter is incremented according to a protocol type.

10. The system of claim 9 wherein said authenticating step executes on a second processing device.

11. The system of claim 10 wherein said second processing device comprises an associated URL.

12. The system of claim 10 wherein said second processing device generates a fault if said authenticating step fails.

13. The system of claim 8 wherein said first processing device comprises a smart card.

14. The system of claim 8 wherein said first processing device comprises an associated URL.

15. The system of claim 14 wherein said first processing device is accessed by traversing said associated URL.

16. A computer program product comprising:
- a computer usable medium comprising computer readable program code embodied therein said computer readable program code configured to:
  - generate a first secure token representative of at least one transaction abstraction at a first processing device having a first associated URL;
  - send said first secure token representative of said transactional abstraction from said first processing device to a second associated URL via an insecure communication fabric wherein said second associated URL represents the address of a second processing device;
  - authenticate said first secure token at said second processing device;
  - send a reply to said first processing device having said first associated URL when said first secure token is authenticated;
- wherein said at least one transactional abstraction comprises a state machine step counter.

17. The computer program product of claim 16 wherein said state machine step counter is incremented according to a protocol type.

18. The computer program product of claim 16 wherein said second processing device generates a fault if said authentication fails.

19. The computer program product of claim 16 wherein said at least one transactional abstraction comprises a transfer amount.

20. The computer program product of claim 16 wherein said first processing device comprises a smart card.

* * * * *